US012705036B2

(12) United States Patent
Cooper

(10) Patent No.: US 12,705,036 B2
(45) Date of Patent: Aug. 11, 2026

(54) VIRTUAL ASSISTANT WITH CONVERSION AND ANALYSIS CAPABILITIES

(71) Applicant: STATE FARM MUTUAL AUTOMOBILE INSURANCE COMPANY, Bloomington, IL (US)

(72) Inventor: Nicholas Cooper, Chicago, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 219 days.

(21) Appl. No.: 18/457,835

(22) Filed: Aug. 29, 2023

(65) Prior Publication Data

US 2024/0289103 A1 Aug. 29, 2024

Related U.S. Application Data

(60) Provisional application No. 63/529,255, filed on Jul. 27, 2023, provisional application No. 63/450,561, (Continued)

(51) Int. Cl.
*G06F 8/51* (2018.01)
*G06F 8/41* (2018.01)

(52) U.S. Cl.
CPC ................ *G06F 8/51* (2013.01); *G06F 8/427* (2013.01); *G06F 8/433* (2013.01)

(58) Field of Classification Search
CPC ........................................................ G06F 8/51
See application file for complete search history.

(56) References Cited

U.S. PATENT DOCUMENTS 6,817,013 B2 * 11/2004 Tabata .................... G06F 8/443 717/136
9,760,343 B2 * 9/2017 Noens ....................... G06F 8/33
(Continued)

FOREIGN PATENT DOCUMENTS

CN 110673840 A * 1/2020 ............... G06F 8/33
CN 114035805 A * 2/2022 ............ G06F 8/423
(Continued)

OTHER PUBLICATIONS

CN-114035805-A: English Text Translation.*

*Primary Examiner* — Francisco J Aponte
(74) *Attorney, Agent, or Firm* — MARSHALL, GERSTEIN & BORUN LLP

(57) ABSTRACT

Methods and systems for converting computer code are provided. The method may comprise (1) receiving, by one or more processors, a first set of computer code in a first coding language and comprising a plurality of components; (2) generating, by the one or more processors, an interrelationship graph of the plurality of components based upon the first set of computer code, wherein the interrelationship graph represents an interrelationship among the plurality of components; (3) generating, by the one or more processors and based upon the interrelationship graph, a plurality of configuration files associated with at least some of the plurality of components; and/or (4) applying, by the one or more processors, a plurality of templates associated with a second coding language to the plurality of configuration files to generate a second set of computer code in the second coding language.

17 Claims, 9 Drawing Sheets

Related U.S. Application Data filed on Mar. 7, 2023, provisional application No. 63/448,866, filed on Feb. 28, 2023.

(56) References Cited

U.S. PATENT DOCUMENTS

| | | | | |
|---|---|---|---|---|
| 10,289,394 | B2 * | 5/2019 | Huang | G06F 8/447 |
| 10,649,746 | B2 * | 5/2020 | Kanhere | G06F 9/3858 |
| 10,877,737 | B2 * | 12/2020 | Munaganuru | G06F 8/427 |
| 10,956,132 | B1 * | 3/2021 | Schneider | G06F 8/40 |
| 11,068,244 | B2 * | 7/2021 | Rich | G06F 8/51 |
| 11,106,440 | B2 * | 8/2021 | Beit-Aharon | G06F 8/51 |
| 11,294,649 | B1 * | 4/2022 | Vishnubotla | G06F 8/40 |
| 11,392,699 | B2 * | 7/2022 | Rubin | G06F 21/563 |
| 11,474,799 | B2 * | 10/2022 | Cseri | G06F 16/2452 |
| 11,586,436 | B1 * | 2/2023 | Jennings | G06F 8/61 |
| 11,625,227 | B2 * | 4/2023 | Kaitha | G06F 8/35 717/106 |
| 2014/0282373 | A1 * | 9/2014 | Garza | G06F 8/51 717/106 |
| 2018/0285101 | A1 * | 10/2018 | Yahav | G06F 8/75 |
| 2019/0102150 | A1 * | 4/2019 | Venkatasubramanian | G06F 9/30065 |
| 2020/0210157 | A1 * | 7/2020 | Munaganuru | G06F 16/2428 |
| 2021/0042639 | A1 * | 2/2021 | Hall | G06F 9/45558 |
| 2021/0055919 | A1 * | 2/2021 | Malik | G06F 8/433 |
| 2021/0096832 | A1 * | 4/2021 | Rich | G06F 40/154 |
| 2022/0012020 | A1 * | 1/2022 | Barke | G06N 20/00 |
| 2022/0188083 | A1 * | 6/2022 | Hicks | G06F 17/16 |
| 2022/0188098 | A1 * | 6/2022 | Hicks | G06N 5/04 |
| 2022/0413819 | A1 * | 12/2022 | Cseri | G06F 16/2452 |
| 2023/0153076 | A1 * | 5/2023 | Benassi | G06F 9/541 717/106 |
| 2024/0256240 | A1 * | 8/2024 | Tenace | G06F 8/51 |
| 2024/0311111 | A1 * | 9/2024 | Liu | G06F 8/41 |

FOREIGN PATENT DOCUMENTS

| | | | | |
|---|---|---|---|---|
| CN | 114327479 A | * | 4/2022 | G06F 9/50 |
| CN | 117093228 A | * | 11/2023 | G06F 8/51 |
| CN | 114461217 B | * | 12/2024 | G06F 8/433 |

* cited by examiner

VIRTUAL ASSISTANT WITH CONVERSION AND ANALYSIS CAPABILITIES

CROSS-REFERENCE TO RELATED APPLICATIONS

This application claims priority to and the benefit of the filing date of (1) provisional U.S. Patent Application No. 63/529,255 entitled "VIRTUAL ASSISTANT WITH CONVERSION AND ANALYSIS CAPABILITIES," filed on Jul. 27, 2023; (2) provisional U.S. Patent Application No. 63/450,561 entitled "VIRTUAL ASSISTANT WITH CONVERSION AND ANALYSIS CAPABILITIES," filed on Mar. 7, 2023; and (3) provisional U.S. Patent Application No. 63/448,866 entitled "VIRTUAL ASSISTANT WITH CONVERSION AND ANALYSIS CAPABILITIES," filed on Feb. 28, 2023, the entire contents of each of which is hereby expressly incorporated herein by reference.

FIELD OF THE INVENTION

The present disclosure generally relates to converting computer code, and more particularly, converting computer code by using an interrelationship graph.

BACKGROUND

In general, computer code may be comprised of a set of rules and syntax that allow programmers to create instructions for computers to perform various tasks. Different coding languages may have different features, advantages, and disadvantages, and may be suitable for different purposes and applications. Sometimes, it may be desirable or necessary to convert computer code written in one coding language to another coding language, for example, to improve compatibility, performance, security, or maintainability of the code.

Existing methods and systems for converting computer code may be limited to a few lines included by one code component (e.g., a function or a class). However, code used in industrial products typically may comprise thousands to millions of interrelated code components. Existing methods or systems may not be capable of analyzing such complex interrelationships among the code components. As a result, different portions of the new code generated by the existing methods or systems may be incompatible with each other. The new code may consequently be inaccurate or inoperable and may require a substantial amount of manual modification. Such manual modification may be cumbersome and may take months to years. Therefore, an accurate, efficient way to convert code that fits real industrial demands is needed.

The conventional code conversion techniques may include additional ineffectiveness, inefficiencies, encumbrances, and/or other drawbacks.

SUMMARY

In one aspect, a computer-implemented method for converting computer code may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, and/or other electronic or electrical components, which may be in wired or wireless communication with one another and may be configured as input and/or output devices or the like. For example, in one instance, the computer-implemented method may include (1) receiving, by one or more processors, a first set of computer code in a first coding language and comprising a plurality of components; (2) generating, by the one or more processors, an interrelationship graph of the plurality of components based upon the first set of computer code, wherein the interrelationship graph represents an interrelationship among the plurality of components; (3) generating, by the one or more processors and based upon the interrelationship graph, a plurality of configuration files associated with at least some of the plurality of components; and/or (4) applying, by the one or more processors, a plurality of templates associated with a second coding language to the plurality of configuration files to generate a second set of computer code in the second coding language. The method may include additional, less, or alternate functionality, including that discussed elsewhere herein.

For instance, the computer-implemented method may include: (1) parsing, by the one or more processors, the first code to obtain a plurality of nodes and a plurality of directed edges, wherein the plurality of nodes includes nodes associated with the plurality of components, and the plurality of directed edges represents an interrelationship among the plurality of nodes; and/or (2) generating, by the one or more processors, the interrelationship graph including the plurality of nodes and the plurality of directed edges. Additionally or alternatively, generating the plurality of configuration files may include: generating the plurality of configuration files based upon the plurality of nodes and the plurality of directed edges.

Additionally, the interrelationship among the plurality of components may include at least one of: (1) an input of a second component of the plurality of components including an output of a first component of the plurality of components, (2) the second component calling the first component, and/or (3) the second component including the first component. Additionally or alternatively, the plurality of components may include at least one of: (1) one or more functions, (2) one or more classes, and/or (3) one or more files. Additionally or alternatively, the plurality of templates may be retrieved from a template database or received from a user.

In one instance, the computer-implemented method may include: (1) adding, by the one or more processors, metadata to the interrelationship graph; and/or (2) filtering, by the one or more processors, the plurality of nodes based upon the metadata. Additionally or alternatively, the plurality of the configuration files may include a plurality of parameters, and at least one parameter of the plurality of parameters may be associated with a function, wherein the function generates a value associated with the at least one parameter when applying the plurality of templates to the plurality of configuration files.

In another aspect, a computer system for converting computer code. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, and/or other electronic or electrical components, which may be in wired or wireless communication with one another and be configured for use as input and/or output devices. For example, in one instance, the computer system may include one or more processors; and a non-transitory memory storing executable instructions thereon that, when executed by the one or more processors, cause the one or more processors to: (1) receive a first set of computer code in a first coding language and comprising a plurality of components; (2) generate an interrelationship graph of the plurality of components based upon the first set of computer code, wherein the interrelationship graph represents an interrelationship among the plurality of components; (3) generate, based upon the interrelationship graph, a plurality of configuration files associated with at least some of the plurality of components; and/or (4) apply a plurality of templates associated with a second coding language to the plurality of configuration files to generate a second set of computer code in the second coding language. The computer system may include additional, fewer, or alternative functionalities, including that discussed elsewhere herein.

In another aspect, a non-transitory computer-readable medium storing processor-executable instructions that, when executed by one or more processors, cause the one or more processors to (1) receive a first set of computer code in a first coding language and comprising a plurality of components; (2) generate an interrelationship graph of the plurality of components based upon the first set of computer code, wherein the interrelationship graph represents an interrelationship among the plurality of components; (3) generate, based upon the interrelationship graph, a plurality of configuration files associated with at least some of the plurality of components; and/or (4) apply a plurality of templates associated with a second coding language to the plurality of configuration files to generate a second set of computer code in the second coding language. The instructions may direct additional, fewer, or alternative functionalities, including that discussed elsewhere herein.

Additional, alternate and/or fewer actions, steps, features and/or functionalities may be included in an aspect and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Overview

The systems and methods disclosed herein are generated related to, inter alia, converting a first set of computer code in a first coding language to a second set of computer code in a second coding language by employing an interrelationship graph generated based upon the first set of computer code. The interrelationship graph represents an interrelationship among components of the first set of computer code. With this interrelationship graph, the system may "appreciate" (e.g., determine, identify, etc.) the topology of the first set of computer code. Accordingly, the systems and methods disclosed herein may generate a second set of computer code that both (1) comprises accurate code inside each code component and (2) maintains an accurate relationship among the code components. As such, the systems and methods disclosed herein may convert computer code comprising thousands of lines and complex component interrelationship in an efficient manner. The resulting code is therefore accurate to the functionality of the original set of code. In some implementations, the process is automatic and, as such, requires only minimal human intervention.

Additional advantages of the systems and methods disclosed herein will be clear from the additional description below. The advantages include but not limited to: (1) An application implementing the methods disclosed herein is user-friendly. When a user inputs code or templates, the application may provide automatic suggestions and/or prompts. Further, the application provides a virtual assistant that allows the user to interact with the application using natural languages. (2) The application is extensible. A user may add customized templates into a template database of the application. (3) The application is capable of handling complicated code. The application may understand the complicated interrelationship among components of the code input by the user and preserve such interrelationship in the converted code. (4) The application is language agnostic. Therefore, the application may convert computer code between any two languages.

Exemplary Computing Environment

Figure 1A:
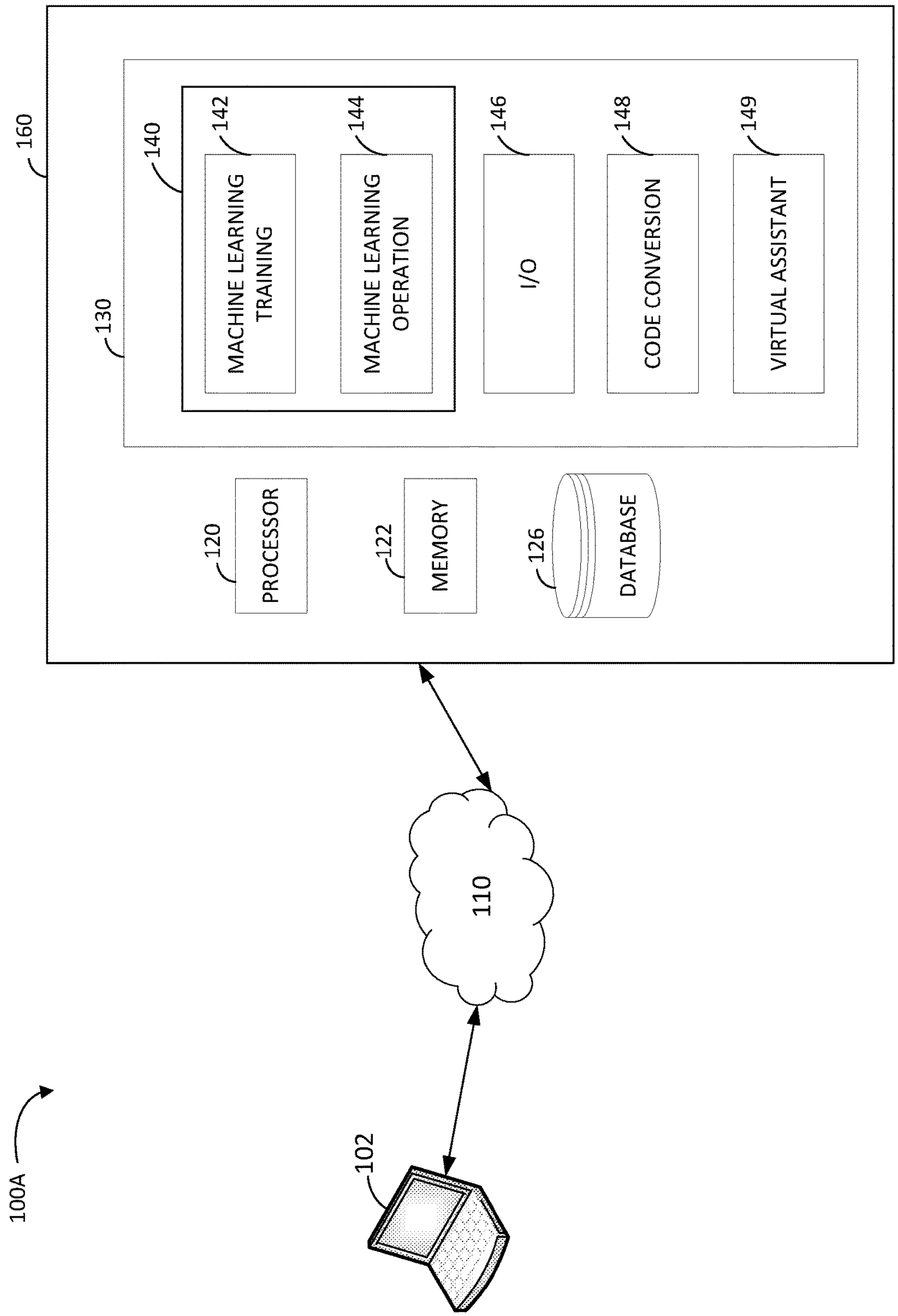
FIG. 1A depicts a block diagram of an exemplary computer system in which computer-implemented methods and computer systems for converting computer code are implemented according to one embodiment.

FIG. 1A depicts a block diagram of an exemplary computing environment 100A in which the methods or systems for converting computer code may be performed, in accordance with various embodiments discussed herein.

In some embodiments, the computing environment 100A may include a user device 102. In various embodiments, the user device 102 may comprise one or more computing devices, which may comprise multiple, redundant, or replicated client computing devices accessed by one or more users. The computing environment 100A may further include an electronic network 110 communicatively coupling other components of the computing environment 100A.

The user device 102 may be any suitable device, including one or more computers, mobile devices, wearables, smart watches, smart contact lenses, smart glasses, augmented reality glasses, virtual reality headsets, mixed or extended reality glasses or headsets, and/or other electronic or electrical component. The user device 102 may include a memory and a processor for, respectively, storing and executing one or more modules. The memory may include one or more suitable storage media such as a magnetic storage device, a solid-state drive, random access memory (RAM), etc. The user device 102 may access services or other components of the computing environment 100A via the network 110.

In some embodiments, one or more servers 160 may perform the functionalities as part of a cloud network or may otherwise communicate with other hardware or software components within one or more cloud computing environments to send, retrieve, or otherwise analyze data or information described herein. For example, in some instances, the computing environment 100A may comprise an on-premises computing environment, a multi-cloud computing environment, a public cloud computing environment, a private cloud computing environment, a hybrid cloud computing environment, and/or any other such computing environment as described herein. The public cloud computing environment may be a traditional off-premises cloud computing environment (i.e., not physically hosted at a location owned/controlled by the business). Alternatively or additionally, aspects of the public cloud may be hosted on-premise at a location owned/controlled by an enterprise generating the customized code.

The network 110 may comprise any suitable network or networks, including a local area network (LAN), wide area network (WAN), Internet, or combination thereof. For example, the network 110 may include a wireless cellular service (e.g., 3G, 4G, 5G, 6G, etc.). Generally, the network 110 enables bidirectional communication between the user device 102 and the servers 160. In some embodiments, the network 110 may comprise a cellular base station, such as cell tower(s), communicating to the one or more components of the computing environment 100A via wired/wireless communications based upon any one or more of various mobile phone standards, including NMT, GSM, CDMA, UMMTS, LTE, 5G, 6G, or the like. Additionally or alternatively, the network 110 may comprise one or more routers, wireless switches, or other such wireless connection points communicating to the components of the computing environment 100A via wireless communications based upon any one or more of various wireless standards, including, by non-limiting example, IEEE 802.11a/b/c/g (WIFI), Bluetooth, and/or the like.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine-readable instructions, methods, processes, elements, or limitations, as illustrated, depicted, or described for the various flowcharts, illustrations, diagrams, figures, and/or other disclosures herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as: read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein. The memory 122 may further store a plurality of computing modules 130, implemented as respective sets of computer-executable instructions (e.g., one or more source code libraries, trained ML models such as neural networks, convolutional neural networks, etc.) as described herein.

Depending on the implementation, a computer program or computer-based product, application, or code (e.g., the model(s), such as ML models, or other computing instructions described herein) may be stored on a computer usable storage medium or a tangible, non-transitory computer-readable medium (e.g., standard random access memory (RAM), an optical disc, a universal serial bus (USB) drive, or the like) having such computer-readable program code or computer instructions embodied therein. In some such implementations, the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements, or limitations, as disclosed herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The database 126 may be a relational database, such as Oracle, DB2, MySQL, a NoSQL based database (e.g., MongoDB), or another suitable database. The database 126 may store data and be used to train and/or operate one or more ML models, chatbots, and/or voice bots.

In some embodiments, the computing modules 130 may include a ML module 140. The ML module 140 may include ML training module (MLTM) 142 and/or ML operation module (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, support vector machines, and/or generative pre-trained transformers. In various embodiments, the implemented ML methods and algorithms are directed toward at least one of a plurality of categorizations of ML, such as supervised learning, unsupervised learning, and reinforcement learning.

In some embodiments, the ML-based algorithms may be included as a library or package executed on server(s) 160. For example, libraries may include a TensorFlow-based library, the PyTorch library, a HuggingFace library, a scikit-learn Python library, and/or any other such appropriate libraries.

In some embodiments, the ML module 140 may employ supervised learning, which involves identifying patterns in existing data to make predictions about subsequently received data. Specifically, the ML module is "trained" (e.g., via MLTM 142) using training data, which includes example inputs and associated example outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing the element with a large sample of data with known characteristics or features.

In some embodiments, the ML module 140 may employ unsupervised learning, which involves finding meaningful relationships in unorganized data. Unlike supervised learning, unsupervised learning does not involve user-initiated training based upon example inputs with associated outputs. Rather, in unsupervised learning, the ML module 140 may organize unlabeled data according to a relationship determined by at least one ML method/algorithm employed by the ML module 140. Unorganized data may include any combination of data inputs and/or ML outputs as described above.

In some embodiments, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes (also referred to as neurons), of the respective layers. Initially, the weights may be initialized to random values, and one or more suitable activation functions may be chosen for the training process. The present techniques may include training a respective output layer of the one or more ML models. The output layer may be trained to output a prediction, for example.

In some embodiments, the MLTM 142 may be trained with configuration files, a parameter to be resolved, and resolved parameter value files. For example, the MLTM 142 may comprise a set of initial parameters. Based upon a first set of configuration files and a parameter to be resolved in the first set of configuration files, the MLTM 142 determines a value of the parameter to be resolved using the set of initial parameters. The MLTM 142 then compares the determined value with the actual parameter and, based upon the comparison result, the MLTM 142 updates the parameters to receive a set of updated parameters. The MLTM 142 may then receive a second set of configuration files and a parameter to be resolved in the second set of configuration files and repeat the process. In this way, the MLTM 142 may be trained to resolve a parameter value in configuration files. In this training process, reinforcement learning, deep learning, and/or other machine learning techniques may be employed.

The MLOM 144 may comprise a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon, when provided with a de novo input that the model has not previously been provided, the model may output one or more predictions, classifications, etc., as described herein.

In some embodiments, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as the computer network 110 and/or the user device 102 (for rendering or visualizing) described herein. In further embodiments, the servers 160 may include a client-server platform technology such as ASP.NET, Java J2EE, Ruby on Rails, Node.js, a web service or online API, responsive for receiving and responding to electronic requests.

The I/O module 146 may further include or implement an operator interface configured to present information to an administrator or operator and/or receive inputs from the administrator and/or operator. An operator interface may provide a display screen. The I/O module 146 may facilitate I/O components (e.g., ports, capacitive or resistive touch sensitive input panels, keys, buttons, lights, LEDs), which may be directly accessible via, or attached to, servers 160 or may be indirectly accessible via or attached to the user device 102. In some embodiments, an administrator or operator may access the servers 160 via the user device 102 to review information, make changes, input training data, initiate training via the MLTM 142, and/or perform other functions (e.g., operation of one or more trained models via the MLOM 144).

In some embodiments, the computing modules 130 may include one or more code conversion modules 148. The code conversion module 148 may comprise a set of computer-executable instructions implementing code conversion functions. In some embodiments, the conversion module 148 may comprise instructions for converting a particular line of computer code from a first coding language to a second language. In some embodiments, the code conversion module 148 may comprise instructions for reading an interrelationship graph disclosed herein below and apply templates to configuration files based upon the topology reflected by the interrelationship graph. The conversion module 148 may comprise instructions for additional functionalities disclosed herein.

In some embodiments, the computing modules 130 may include a virtual assistant 149. The virtual assistant 149 may employ natural language processing techniques and/or incorporate features of a chatbot, such as a ML model 140 and/or a machine learning chatbot disclosed herein with regard to at least FIG. 1C. More specifically, the virtual assistant 149 may be programed to simulate human conversation, interact with users, understand their needs, and recommend an appropriate line of action with minimal and/or no human intervention, among other things. This may include providing the best response of any query that it receives and/or asking follow-up questions.

In some embodiments, the virtual assistant 149 may respond to questions regarding the methods and systems disclosed herein. The virtual assistant 149 may provide responses with texts, audios, images, videos, and/or other appropriate formats. In further embodiments, the virtual assistant 149 may provide automatic suggestions to assist the user with coding and/or debugging. In yet further embodiments, the virtual assistant 149 may take actions in response to the user's prompts. To this end, the virtual assistant 149 may, in response to the user's prompts, generate executable instructions that, when executed by the one or more processors 120, cause the one or more processors 120 to perform the actions desired by the user.

Although the computing environment 100A is shown to include one user device 102, one server 160, and one network 110, it should be understood that different numbers of user devices 102, networks 110, and/or servers 160 may be utilized. In some embodiments, the computing environment 100A may include a plurality of servers 160 and hundreds or thousands of user devices 102, all of which may be interconnected via the network 110. Furthermore, the database storage or processing performed by the one or more servers 160 may be distributed among a plurality of servers 160 in an arrangement known as "cloud computing." This configuration may provide various advantages, such as enabling near real-time uploads and downloads of information as well as periodic uploads and downloads of information.

The computing environment 100A may include additional, fewer, and/or alternate components, and may be configured to perform additional, fewer, or alternate actions, including components/actions described herein. Although the computing environment 100A is shown in FIG. 1A as including one instance of various components such as user device 102, server 160, and network 110, etc., various embodiments include the computing environment 100A implementing any suitable number of any of the components shown in FIG. 1A and/or omitting any suitable ones of the components shown in FIG. 1A. For instance, information described as being stored at server database 126 may be stored at memory 122, and thus database 126 may be omitted.

Moreover, various embodiments include the computing environment 100A including any suitable additional component(s) not shown in FIG. 1A, such as but not limited to the exemplary components described above. Furthermore, one will appreciate that additional and/or alternative connections between components shown in FIG. 1A may be implemented. As just one example, server 160 and user device 102 may be connected via a direct communication link (not shown in FIG. 1A) instead of, or in addition to, via network 110.

Figure 1B:
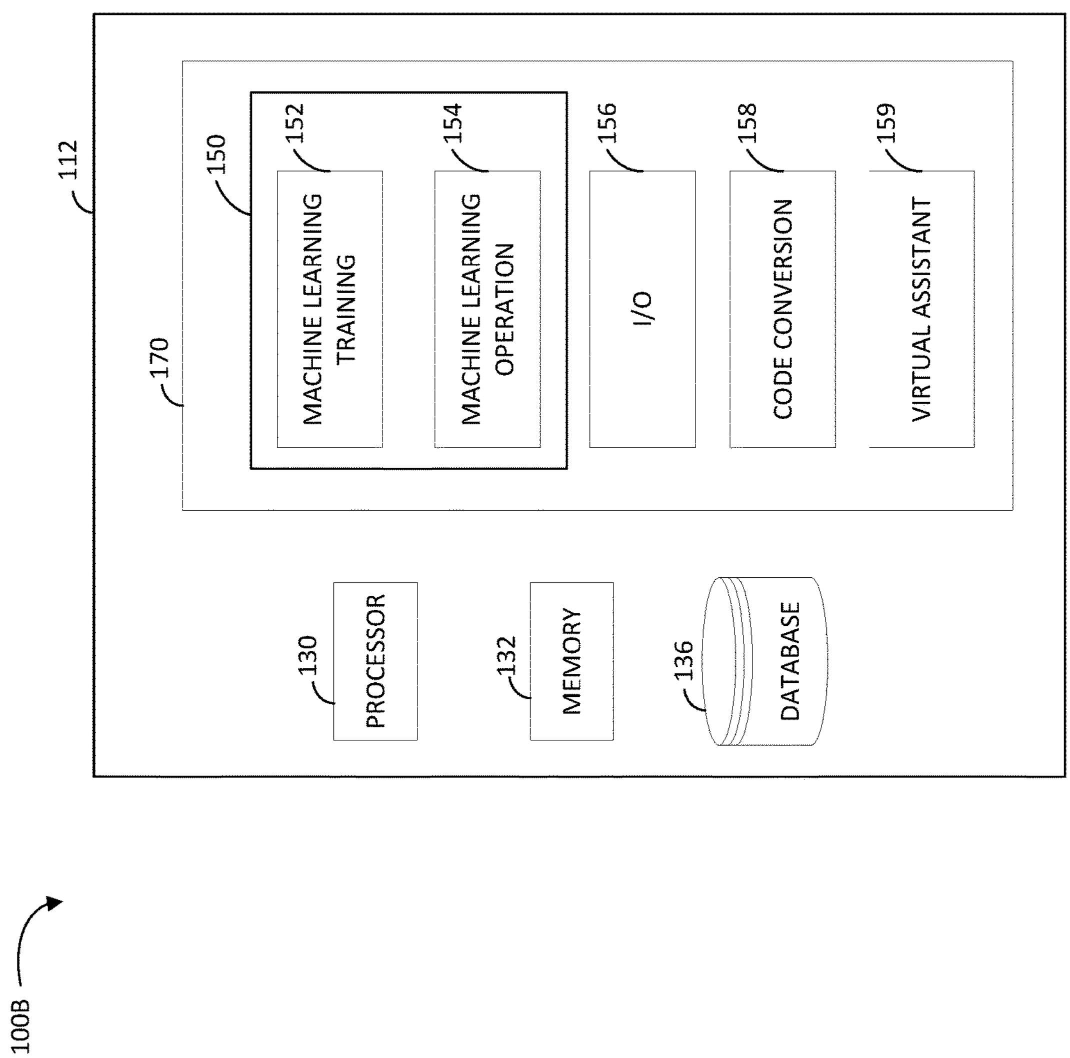
FIG. 1B depicts a block diagram of an exemplary computer system in which methods and systems for converting computer code are implemented according to one embodiment.

FIG. 1B depicts a block diagram of an exemplary computing environment 100B in which code conversion may be performed. The computing device 112 may be a user device (such as the user device 102). The computing device 112 may include (i) one or more processors 130 configured in a similar manner as the one or more processors 120, (ii) one or more memories 132 configured in a similar manner as the one or more memories 122, (iii) one or more databases 136 configured in a similar manner as the one or more databases 126, (iv) an I/O module 156 configured in a similar as the I/O module 146, and/or (v) other suitable components. In some embodiments, the computing device may further comprise (i) a ML module 150 configured in a similar manner as the ML module 140, (ii) a code conversion module 158 configured in a similar manner as the code conversion module 148, (iii) a virtual assistant 159 configured in a similar manner as the virtual assistant 149, and/or (iv) other suitable modules.

In the exemplary computing environment 100A, the server 160 and the user device 102 implement the method of converting computer code disclosed herein collaboratively. The user device 102 may interact with a user to receive code, templates, and/or indications from the user. The server 160 may perform the code conversion steps and/or other computationally demanding tasks. In this way, the application implementing the method disclosed herein installed on the user device 102 may be a thin front-end without sacrificing the overall efficiency of the process.

In the exemplary computing environment 100B, the computing device 112 may implement the method of converting computer code disclosed herein alone. That is, the computing device 112 may interact with the user and perform the code conversion process. In this way, a user does not need to connect the computing device 112 to a server to perform the code conversion process, which may be advantageous when the user has no access to a server or the Internet.

Exemplary Training of the ML Chatbot Model

The virtual assistant 149 may employ a ML chatbot (e.g., ChatGPT), to provide tailored, conversational-like customer service relevant to a line of business. The chatbot may be capable of understanding user requests, providing relevant information, escalating issues, etc., any of which may assist and/or replace the need for service assets of an enterprise. Additionally, the chatbot may generate data from user interactions which the enterprise may use to personalize future support and/or improve the chatbot's functionality (e.g., when retraining and/or fine-tuning the chatbot).

In certain embodiments, the machine learning chatbot may be configured to utilize artificial intelligence and/or machine learning techniques. For instance, the machine learning chatbot or voice bot may be a ChatGPT chat bot. The machine learning chatbot may employ supervised or unsupervised machine learning techniques, which may be followed by, and/or used in conjunction with, reinforced or reinforcement learning techniques. The machine learning chatbot may employ the techniques utilized for ChatGPT. The machine learning chatbot may be configured to generate verbal, audible, visual, graphic, text, or textual output for either human or other bot/machine consumption or dialogue.

The ML chatbot may provide advanced features as compared to a non-ML chatbot, which may include and/or derive functionality from a large language model (LLM). The ML chatbot may be trained on a server, such as server 160, using large training datasets of text which may provide sophisticated capability for natural-language tasks, such as answering questions and/or holding conversations. The ML chatbot may include a general-purpose pretrained LLM which, when provided with a starting set of words (prompt) as an input, may attempt to provide an output (response) of the most likely set of words that follow from the input.

In some embodiments, the prompt may be provided to, and/or the response received from, the ML chatbot and/or any other ML model, via a user interface of the server. This may include a user interface device operably connected to the server via an I/O functionality, such as the I/O functionality 146. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user prompts and/or utterances, which may require the ML chatbot to keep track of an entire conversation history as well as the current state of the conversation. The ML chatbot may rely on various techniques to engage in conversations with users, which may include the use of short-term and long-term memory. Short-term memory may temporarily store information (e.g., in the memory 122 of the server 160) that may be required for immediate use and may keep track of the current state of the conversation and/or to understand the user's latest input in order to generate an appropriate response.

Long-term memory may include persistent storage of information (e.g., on database 126 of the server 160), which may be accessed over an extended period of time. The long-term memory may be used by the ML chatbot to store information about the user (e.g., preferences, chat history, etc.) and may be useful for improving an overall user experience by enabling the ML chatbot to personalize and/or provide more informed responses.

The system and methods to generate and/or train a ML chatbot model (e.g., via the ML module 140 of the server 160) which may be used by a ML chatbot, may consist of three steps: (1) a supervised fine-tuning (SFT) step where a pretrained language model (e.g., an LLM) may be fine-tuned on a relatively small amount of demonstration data curated by human labelers to learn a supervised policy (SFT ML model), which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model.

In one embodiment, step one may take place only once, while steps two and three may be iterated continuously (e.g., more comparison data is collected on the current ML chatbot model), which may be used to optimize/update the reward model.

Supervised Fine-Tuning ML Model

Figure 1C:
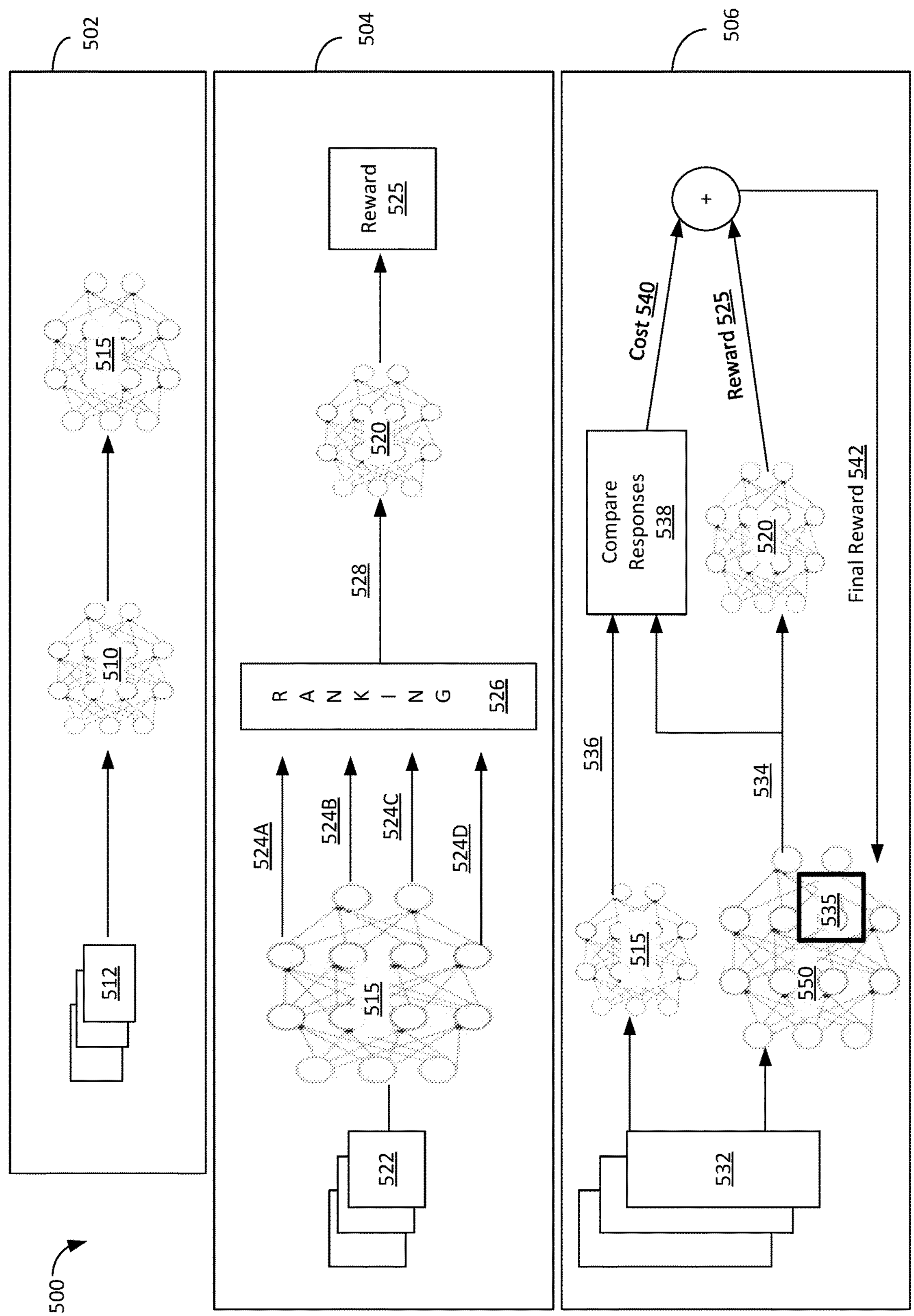
FIG. 1C depicts a combined block and logic diagram in which exemplary computer-implemented methods and systems for training a ML chatbot are implemented according to one embodiment.

FIG. 1C depicts a combined block and logic diagram 500 for training a ML chatbot model, in which the techniques described herein may be implemented, according to some embodiments. Some of the blocks in FIG. 1C may represent hardware and/or software components, other blocks may represent data structures or memory storing these data structures, registers, or state variables (e.g., 512), and other blocks may represent output data (e.g., 525). Input and/or output signals may be represented by arrows labeled with corresponding signal names and/or other identifiers. The methods and systems may include one or more servers 502, 504, 506, such as the server 160 of FIG. 1A.

In one aspect, the server 502 may fine-tune a pretrained language model 510. The pretrained language model 510 may be obtained by the server 502 and be stored in a memory, such as memory 122 and/or database 126. The pretrained language model 510 may be loaded into a ML training functionality, such as MLTF 142, by the server 502 for retraining/fine-tuning. A supervised training dataset 512 may be used to fine-tune the pretrained language model 510 wherein each data input prompt to the pretrained language model 510 may have a known output response for the pretrained language model 510 to learn from. The supervised training dataset 512 may be stored in a memory of the server 502 (e.g., the memory 122 or the database 126).

In one aspect, the data labelers may create the supervised training dataset 512 prompts and appropriate responses. The pretrained language model 510 may be fine-tuned using the supervised training dataset 512 resulting in the SFT ML model 515, which may provide appropriate responses to user prompts once trained. The trained SFT ML model 515 may be stored in a memory of the server 502 (e.g., memory 122 and/or database 126).

In one aspect, the supervised training dataset 512 may include (1) questions associated with systems and methods disclosed herein and responses associated with the prompts, (2) computer code and errors analysis associated with the computer code, (3) prompts associated with actions directed to an application implementing the methods disclosed herein and executable instructions associated with the actions, and/or (4) other prompts and responses related to implementing embodiments of the systems and methods disclosed herein.

Training the Reward Model

In one aspect, training the ML chatbot model 550 may include the server 504 training a reward model 520 to provide, as an output, a scalar value/reward 525. The reward model 520 may leverage reinforcement learning with human feedback (RLHF), in which a model (e.g., ML chatbot model 550) learns to produce outputs which maximize the reward 525, and in doing so may provide responses which are better aligned to user prompts.

Training the reward model 520 may include the server 504 providing a single prompt 522 to the SFT ML model 515 as an input. The input prompt 522 may be provided via an input device (e.g., a keyboard) via the I/O functionality of the server, such as I/O functionality 146. The prompt 522 may be previously unknown to the SFT ML model 515, e.g., the labelers may generate new prompt data, the prompt 522 may include testing data stored on database 126, and/or any other suitable prompt data.

The SFT ML model 515 may generate multiple, different output responses 524A, 524B, 524C, 524D to the single prompt 522. The server 504 may output the responses 524A, 524B, 524C, 524D via an I/O functionality (e.g., I/O functionality 146) to a user interface device, such as a display (e.g., as text responses), a speaker (e.g., as audio/voice responses), and/or any other suitable manner of output of the responses 524A, 524B, 524C, 524D for review by the data labelers.

The data labelers may provide feedback via the server 504 on the responses 524A, 524B, 524C, 524D when ranking 526 the responses 524A, 524B, 524C, 524D from best to worst based upon the prompt-response pairs. The data labelers may rank 526 the responses 524A, 524B, 524C, 524D by labeling the associated data. The ranked prompt-response pairs 528 may be used to train the reward model 520. In some embodiments, the server 504 may load the reward model 520 via the ML functionality (e.g., the ML module 140) and train the reward model 520 using the ranked response pairs 528 as input. The reward model 520 may provide, as an output, the scalar reward 525.

In one aspect, the scalar reward 525 may include a value numerically representing a human preference for the best and/or most expected response to a prompt (i.e., a higher scalar reward value may indicate the user is more likely to prefer that response, and a lower scalar reward may indicate that the user is less likely to prefer that response). For example, inputting the "winning" prompt-response (i.e., input-output) pair data to the reward model 520 may generate a winning reward. Inputting a "losing" prompt-response pair data to the same reward model 520 may generate a losing reward. The reward model 520 and/or scalar reward 536 may be updated based upon labelers ranking 526 additional prompt-response pairs generated in response to additional prompts 522.

In one example, a data labeler may provide to the SFT ML model 515 as an input prompt 522, "Describe the sky." The input may be provided by the labeler via the user device 102 over network 110 to the server 504 running a chatbot application utilizing the SFT ML model 515. The SFT ML model 515 may provide, as output responses to the labeler via the user device 102: (i) "the sky is above" 524A; (ii) "the sky includes the atmosphere and may be considered a place between the ground and outer space" 524B; and (iii) "the sky is heavenly" 524C.

The data labeler may rank 526, via labeling the prompt-response pairs, prompt-response pair 522/524B as the most preferred answer; prompt-response pair 522/524A as a less preferred answer; and prompt-response 522/524C as the least preferred answer. The labeler may rank 526 the prompt-response pair data in any suitable manner. The ranked prompt-response pairs 528 may be provided to the reward model 520 to generate the scalar reward 525.

While the reward model 520 may provide the scalar reward 525 as an output, the reward model 520 may not generate a response (e.g., text). Rather, the scalar reward 525 may be used by a version of the SFT ML model 515 to generate more accurate responses to prompts (i.e., the SFT model 515 may generate the response such as text to the prompt, and the reward model 520 may receive the response to generate a scalar reward 525 of how well humans perceive it). Reinforcement learning may optimize the SFT model 515 with respect to the reward model 520 which may realize the configured ML chatbot model 550.

RLHF to Train the ML Chatbot Model

In one aspect, the server 506 may train the ML chatbot model 550 (e.g., via the ML module 140) to generate a response 534 to a random, new and/or previously unknown user prompt 532. To generate the response 534, the ML chatbot model 550 may use a policy 535 (e.g., algorithm) which the ML chatbot model 550 learns during training of the reward model 520, and in doing so may advance from the SFT model 515 to the ML chatbot model 550. The policy 535 may represent a strategy that the ML chatbot model 550 learns to maximize its reward 525.

As discussed herein, based upon prompt-response pairs, a human labeler may continuously provide feedback to assist in determining how well the ML chatbot's 550 responses match expected responses to determine rewards 525. The rewards 525 may feed back into the ML chatbot model 550 to evolve the policy 535. Thus, the policy 535 may adjust the parameters of the ML chatbot model 550 based upon the rewards 525 it receives for generating good responses. The policy 535 may update as the ML chatbot model 550 provides responses 534 to additional prompts 532.

In one aspect, the response 534 of the ML chatbot model 550 using the policy 535 based upon the reward 525 may be compared using a cost function 538 to the SFT ML model 515 (which may not use a policy) response 536 of the same prompt 532. The cost function 538 may be trained in a similar manner and/or contemporaneous with the reward model 520. The server 506 may compute a cost 540 based upon the cost function 538 of the responses 534, 536. The cost 540 may reduce the distance between the responses 534, 536, i.e., a statistical distance measuring how one probability distribution is different from a second, in one aspect the response 534 of the ML chatbot model 550 versus the response 536 of the SFT model 515.

Using the cost 540 to reduce the distance between the responses 534, 536 may avoid a server over-optimizing the reward model 520 and deviating too drastically from the human-intended/preferred response. Without the cost 540, the ML chatbot model 550 optimizations may result in generating responses 534 which are unreasonable but may still result in the reward model 520 outputting a high reward 525.

In one aspect, the responses 534 of the ML chatbot model 550 using the current policy 535 may be passed by the server 506 to the rewards model 520, which may return the scalar reward 525. The ML chatbot model 550 response 534 may be compared via the cost function 538 to the SFT ML model 515 response 536 by the server 506 to compute the cost 540. The server 506 may generate a final reward 542 which may include the scalar reward 525 offset and/or restricted by the cost 540. The final reward 542 may be provided by the server 506 to the ML chatbot model 550 and may update the policy 535, which in turn may improve the functionality of the ML chatbot model 550.

To optimize the ML chatbot 550 over time, RLHF via the human labeler feedback may continue ranking 526 responses of the ML chatbot model 550 versus outputs of earlier/other versions of the SFT ML model 515, i.e., providing positive or negative rewards 525. The RLHF may allow the servers (e.g., servers 504, 506) to continue iteratively updating the reward model 520 and/or the policy 535. As a result, the ML chatbot model 550 may be retrained and/or fine-tuned based upon the human feedback via the RLHF process, and throughout continuing conversations may become increasingly efficient.

Although multiple servers 502, 504, 506 are depicted in the exemplary block and logic diagram 500, each providing one of the three steps of the overall ML chatbot model 550 training, fewer and/or additional servers may be utilized and/or may provide the one or more steps of the ML chatbot model 550 training. In one aspect, one server may provide the entire ML chatbot model 550 training.

Exemplary Interrelationship Graph

Figure 2:
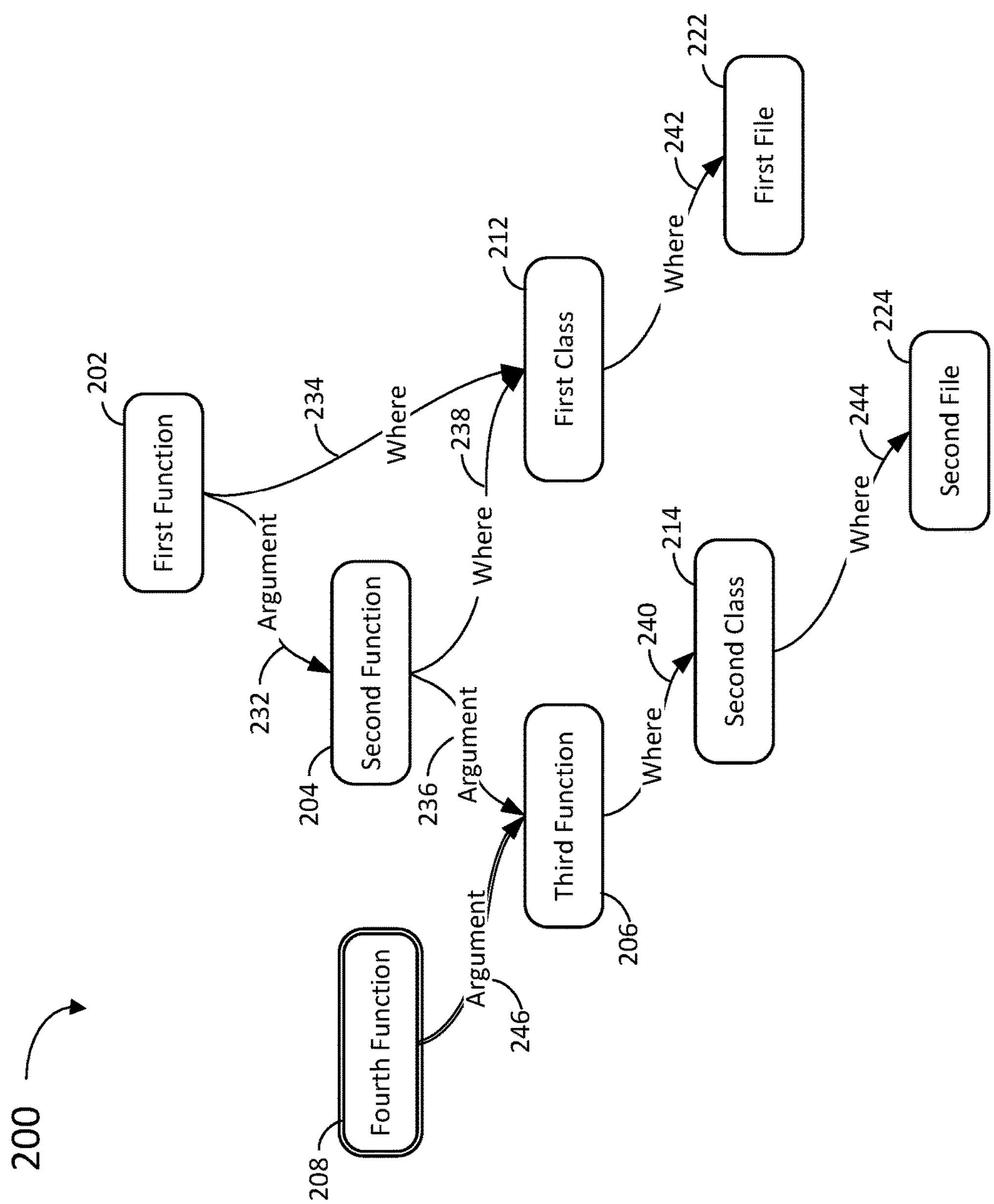
FIG. 2 depicts an exemplary interrelationship graph generated by the system or method disclosed herein according to one embodiment.

FIG. 2 depicts an exemplary interrelationship graph 200 disclosed herein according to one embodiment. The interrelationship graph 200 may be generated based upon a first set of computer code input by a user. The code may include a plurality of components. A component may be a code file (e.g., a file named "code.py" is a code file in Python), a code class (e.g., a code section beginning with "class" is a code class in Python), a code function (e.g., a code section beginning with "def" is a code class in Python), and/or other code modules.

The interrelationship graph 200 may comprise a plurality of nodes 202-208, 212-214, 222-224 and a plurality of edges 232-246. Each of the nodes 202-206, 212-214, 222-224 may represent a component of the code. For example, nodes 222-224 may represent codes files in the code, nodes 212-

214 may represent code classes in the code, and nodes 202-206 may represent code functions in the code. In some embodiments, the nodes representing different types of components may be shown in different manners. For example, the nodes 222-224 representing code files may be shown in a different color, size, and/or font from the nodes 212-214 representing code classes.

Each of the edges 232-244 may connect two nodes. The edges may show a relationship between the nodes connected by them. In some embodiments, the edges may include directions (e.g., arrows). For example, in the exemplary embodiment of FIG. 2, the edge 232 connects the node 202 and the node 204. The node 202 may represent a first function in the code input by the user. The node 204 may represent a second function in the code input by the user. An output of the first function may be an argument in the second function according to the initial code. Accordingly, the edge 232 may point from the node 202 to the node 204 and illustrates the relationship between the node 202 and the node 204 with a keyword "Argument."

In another example, the node 206 may represent a third function. The third function may call the second function in the body of the third function. Accordingly, the edge 236 may point from the node 204 to the node 206 and illustrate the relationship between the node 204 and the node 206 with a keyword "Argument."

In yet another example, the node 212 may represent a first class in the code input by the user. The first class may include the first function in the code input by the user. Accordingly, the edge 234 may point from the node 202 to the node 212, and show the relationship between the node 202 and the node 212 with a keyword "Where." Although only two different keywords "Argument" and "Where" are shown in the interrelationship graph 200, various other keywords are envisioned, such as "call," "invoke," "same," "similar," "conflict," etc.

In some embodiments, the interrelationship graph 200 may include a necessary component missing from the code input by the user. For example, in the code input by the user, the third function may call a fourth function. The fourth function, however, is missing from the code input by the user. The interrelationship graph may nonetheless present the fourth function with a node 208 and the relationship between the node 208 and the node 206 with an edge 246. A node representing a missing component may by shown in a different manner from other nodes.

Although the interrelationship graph 200 is shown as a directed acyclic graph (DAG), other suitable graphs or manners for representing interrelationship among components of code may be used in the method disclosed herein.

Exemplary Graphical User Interface (GUI)

FIGS. 3A-3E depict an exemplary GUI 300 of an application implementing the method for converting computer code disclosed herein according to one embodiment. Although the GUI 300 is described below as the application being run on a user device 102 communicating with a server 160 via a network 110, one will appreciate that the application may also be run on a computing device 112.

Figure 3A:
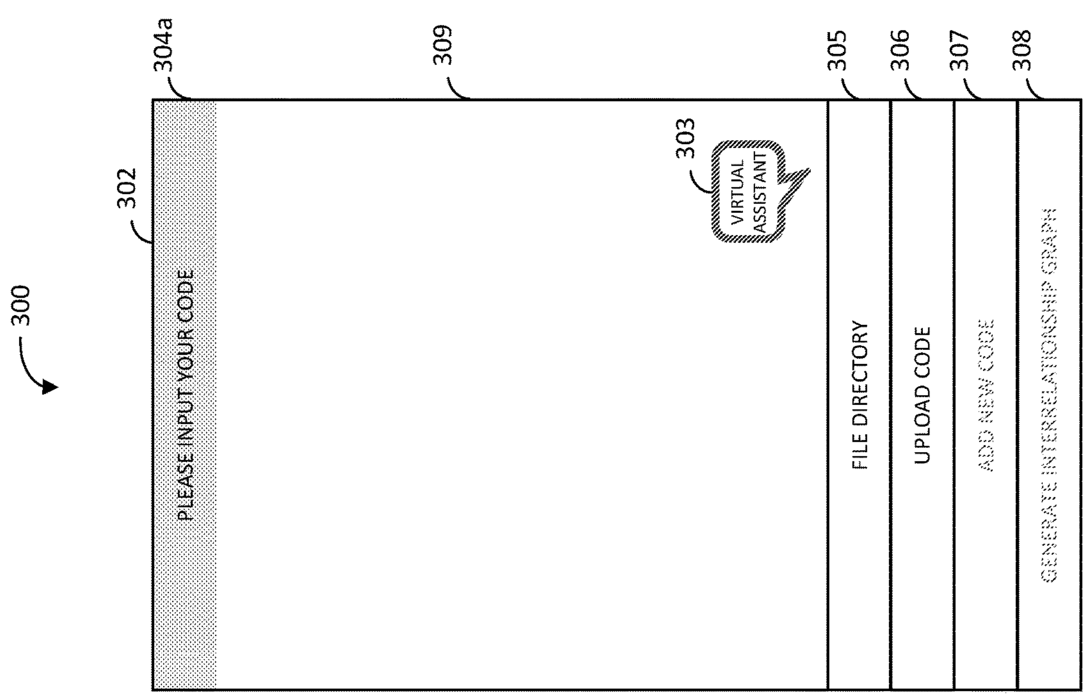
FIG. 3A depicts an exemplary display of an application implementing a computer-implemented method for converting computer code according to one embodiment.

Referring to FIG. 3A, when a user starts the application, the user device 102 may display a GUI 300. The GUI 300 may include a code input window 302. The GUI 300 may display a first thread 304*a* in connection with the input window 302. The first thread 304*a* may indicate that the user may input code in the code input window 302, such as "PLEASE INPUT YOUR CODE." The user may choose to input the code by typing (or copying and pasting) code in the input box 309, by uploading one or more code files by interacting with selectable icon "UPLOAD CODE" 306, or by inputting a file directory referencing one or more code files by interacting with selectable icon "FILE DIRECTORY" 305.

The GUI 300 may further include a selectable icon for a virtual assistant 303 (such as the virtual assistant 149). When the user interacts with the selectable icon 303, a window for chat (not depicted) may pop up. The user may ask questions (e.g., "How to upload my code?") and instruct the application to perform certain actions (e.g., "I'd like to upload my code.") in the window for virtual assistant. The user may interact with the virtual assistant 303 by inputting textual prompts, audible prompts, image prompts, and/or prompts in other appropriate formats. The virtual assistant 303, in addition to take actions according to the prompts, may provide textual responses, audible responses, image responses, and/or responses in other appropriate formats. In further embodiments, the GUI 300 may generally function as and/or include an overall virtual assistant, and the user may input commands into a command line to cause the virtual assistant to perform various operations as described herein.

Figure 3B:
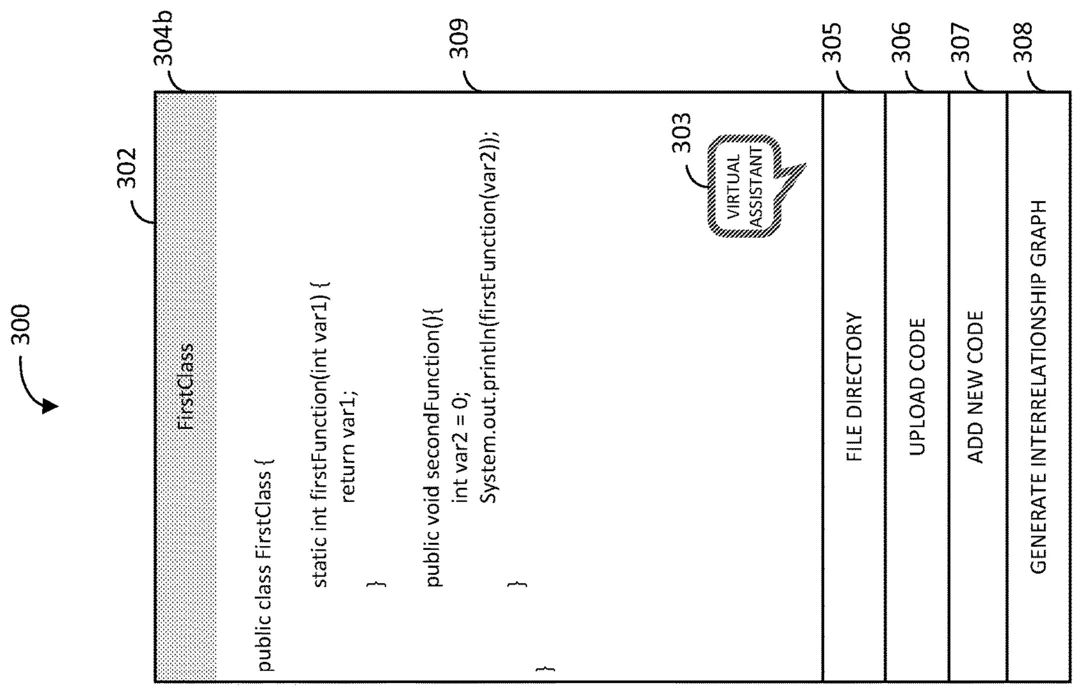
FIG. 3B depicts an exemplary display similar to FIG. 3A, but in which the user inputs a first set of computer code into the application according to one embodiment.

Turning to FIG. 3B, after the user inputs code in the code input window 302, the GUI 300 may display a second thread 304*b*. The second thread 304*b* may be a string that represents the code input by the user. In the example illustrated in FIG. 3B, the code input by the user is a code class named "FirstClass." Accordingly, the second thread 304*b* may be "FirstClass." In another example, the user may upload a code file and the second thread 304*b* may be the file name of the code file. For instance, if a code file name is "FirstClass.java," the second thread 304*b* may be "FirstClass.java" or "FirstClass." Although the configuration file shown in FIG. 3C is written in Java, one will appreciate that the user may input code in other coding languages.

After the user inputs code in the code input window 302, a selectable icon "ADD NEW CODE" 307 may change color to indicate it is now selectable (e.g., turning from gray to black). The user may interact with the selectable icon 307 to open a new code input window (not depicted) similar to the code input window 302. The user may then input code in the code input window in a similar manner as described herein above with respect to FIG. 3A.

After the user inputs code in the code input window 302, a selectable icon "GENERATE INTERRELATIONSHIP GRAPH" 308 may change color to indicate it is now selectable (e.g., turning from gray to black). The user may interact with the selectable icon 308 to cause the server 160 to generate an interrelationship graph based upon the code input by the user (such as the interrelationship graph 200 in FIG. 2).

Figure 3C:
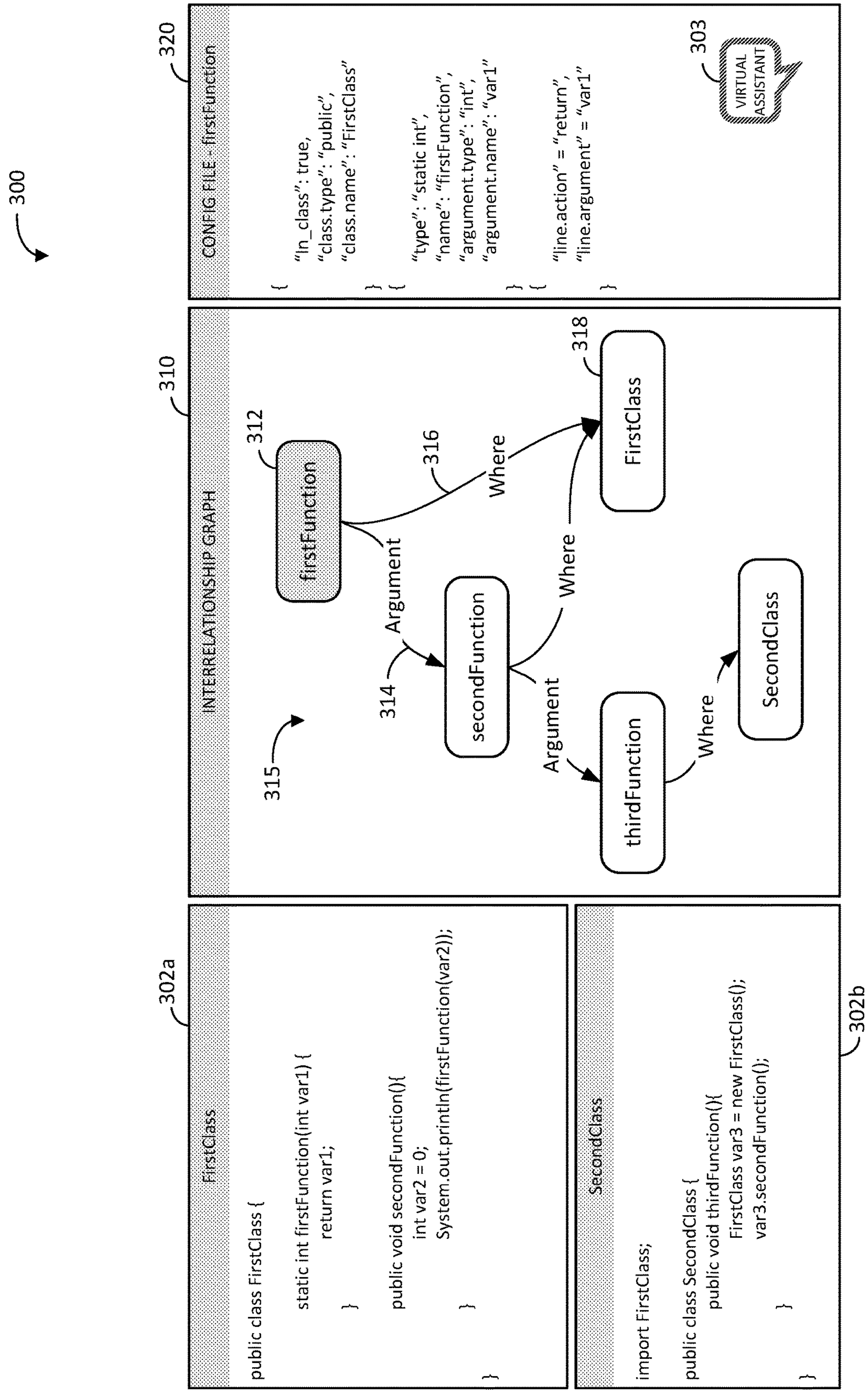
FIG. 3C depicts an exemplary display similar to FIG. 3B, but in which the user causes the application to generate an interrelationship graph and configuration files according to one embodiment.

Turning to FIG. 3C, upon the user interacting with the selectable icon 308, the GUI 300 may display an interrelationship graph 315 in an interrelationship graph window 310. The GUI 300 may display one or more code input window 302*a*-302*b* to show the code input by the user. The interrelationship graph 315 represents the interrelationship among the components in the code input by the user, and in this example, the interrelationship among "FirstClass," "firstFunction," "secondFunction," "SecondClass," and "thirdFunction."

When the user interacts with one of the nodes, the GUI 300 may display a configuration file window 320 corresponding to the node. In the example illustrated in FIG. 3C, the user interacts with the node 312 that represents "firstFunction" in the code input by the user. Accordingly, the configuration file window 320 may show a configuration file corresponding to "firstFunction."

A configuration file serves as a source-of-truth for a corresponding component. That is, a configuration file is a reference file of its corresponding component and includes all necessary information of the corresponding component. Although the configuration file shown in FIG. 3C is generated in the format of JSON (i.e., a .json file), one will appreciate that the server 160 may generate configuration files in other appropriate formats (e.g., .cfg, .ini, .toml, etc.).

Figure 3D:
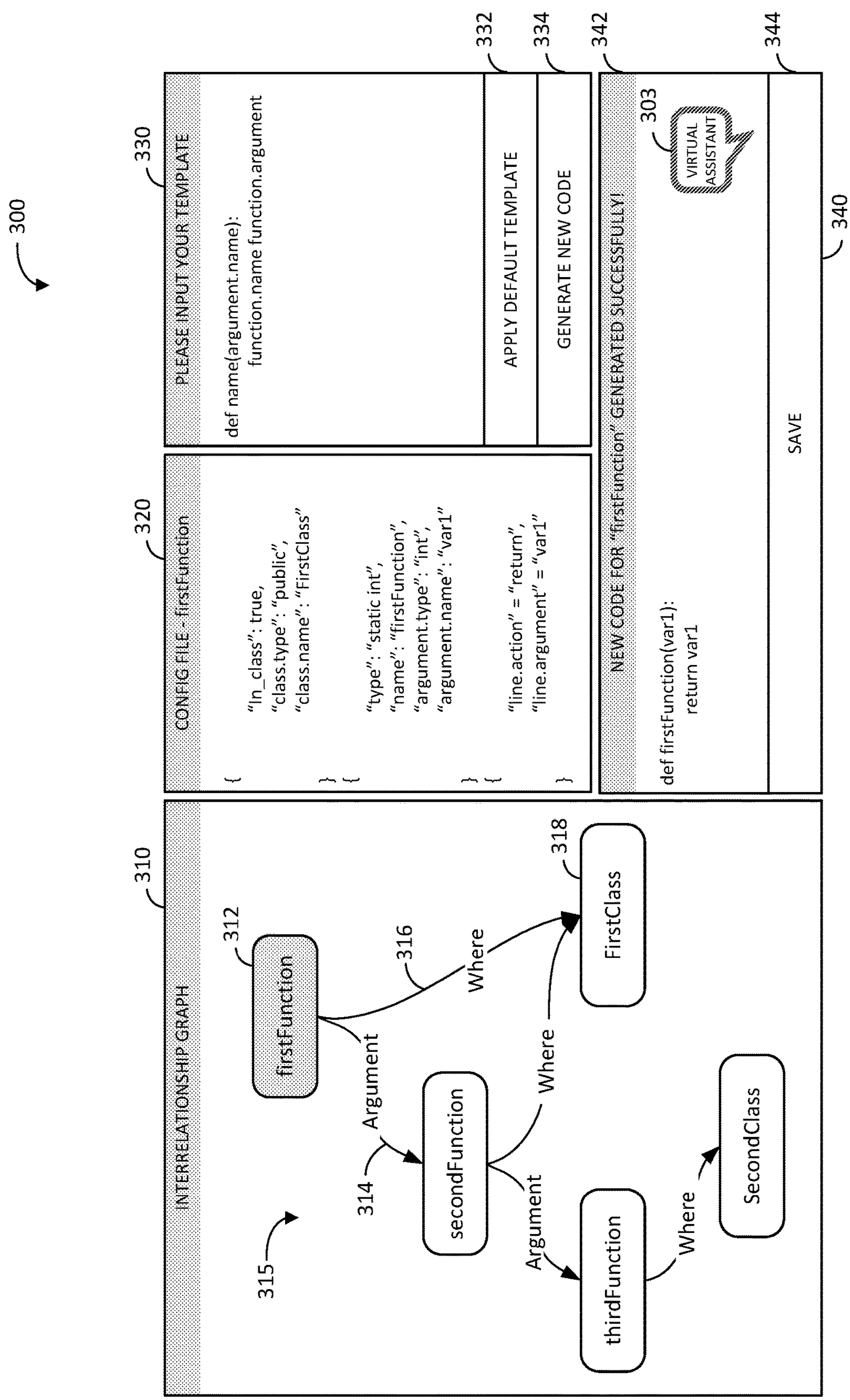
FIG. 3D depicts an exemplary display similar to FIG. 3C, but in which the user causes the application to generate new code corresponding to a component of the first set of computer code according to one embodiment.

Turning to FIG. 3D, the GUI 300 may also display a template input window 330 when the user interacts with a node of the interrelationship graph. In the example illustrated in FIG. 3D, the user interacts with the node 312 that represents "firstFunction" in the code input by the user. Accordingly, the template input window 330 is for the template associated with "firstFunction."

In some embodiments, the template input window 330 may display a default template when the template input window 330 is initiated. In other embodiments, the template input window 330 may display a default template only when the user interacts with a selectable icon "APPLY DEFAULT TEMPLATE" 332. The user may edit the default template. In yet other embodiments, the configuration file may be input by the user or generated based upon the user's instructions as described herein.

After a user inputs a template for a component, the user may interact with a selectable icon "GENERATE NEW CODE" 334 to generate new code for the component. In response, the GUI 300 may display a component code generation window 340. If new code is generated successfully, the GUI 342 may display a thread 342 indicating the success. The GUI 300 may display the new code in the component code generation window 340. Otherwise, if the server 160 fails to generate the new code, the GUI 300 may display an indication of the error in the component code generation window 340 (not depicted).

Figure 3E:
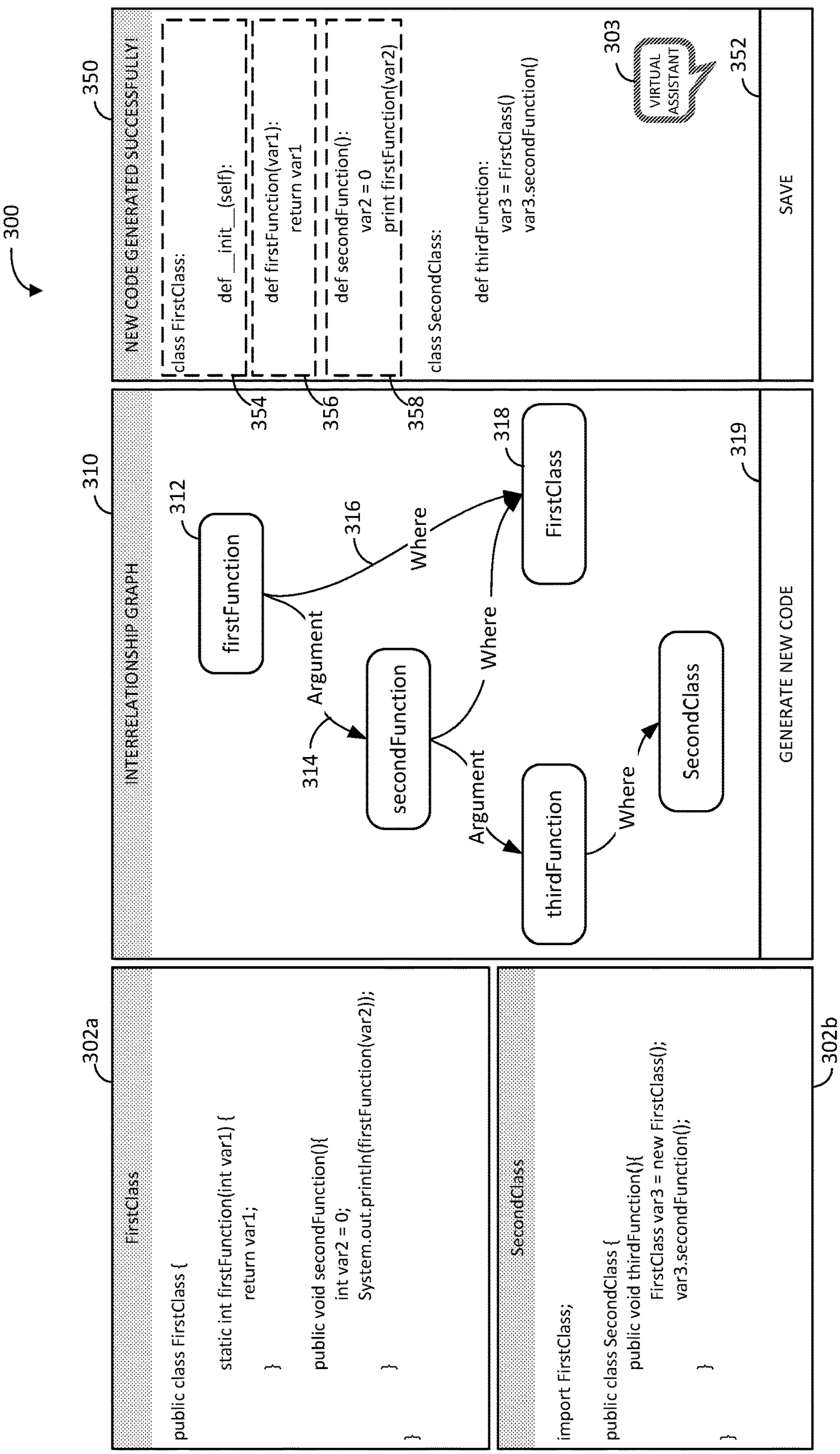
FIG. 3E depicts an exemplary display similar to FIG. 3D, but in which the user causes the application to generate a second set of computer code corresponding to the first set of computer code according to one embodiment.

Turning to FIG. 3E, in some embodiments, after code for each component are generated, the GUI 300 may display a selectable icon "GENERATE NEW CODE" 319. The user may interact with the selectable icon 319 to cause the server 160 to generate new code corresponding to the entire code input by the user. The GUI 300 may display a code generation window 350 that shows the new code. In other embodiments, after the user inputs the template for each component but without generating code for each component, the GUI 300 may display the selectable icon 319 and generate new code upon the user interacting with the selectable icon 319.

Although the new code in FIGS. 3D and 3E is generated in Python, one will appreciate that new code may be generated in other coding languages according to the template(s).

Although not depicted in FIGS. 3A-3E, the GUI 300 may include a terminal window. The user may input commands in the terminal window to cause the user device 102 or the server 160 to perform desired actions, without interacting with some or all selectable icons in the GUI 300. To this end, the virtual assistant 303 may, in response to the user's prompts, generate executable instructions that, when executed by the one or more processors 120, cause the one or more processors 120 to perform the actions desired by the user.

Although not explicitly illustrated in FIGS. 3A-3E, the user may interact with the virtual assistant 303 to cause the user device 102 or the server 160 to perform desired actions, without interacting with some or all selectable icons in the GUI 300.

Exemplary Computer-Implemented Method

Figure 4:
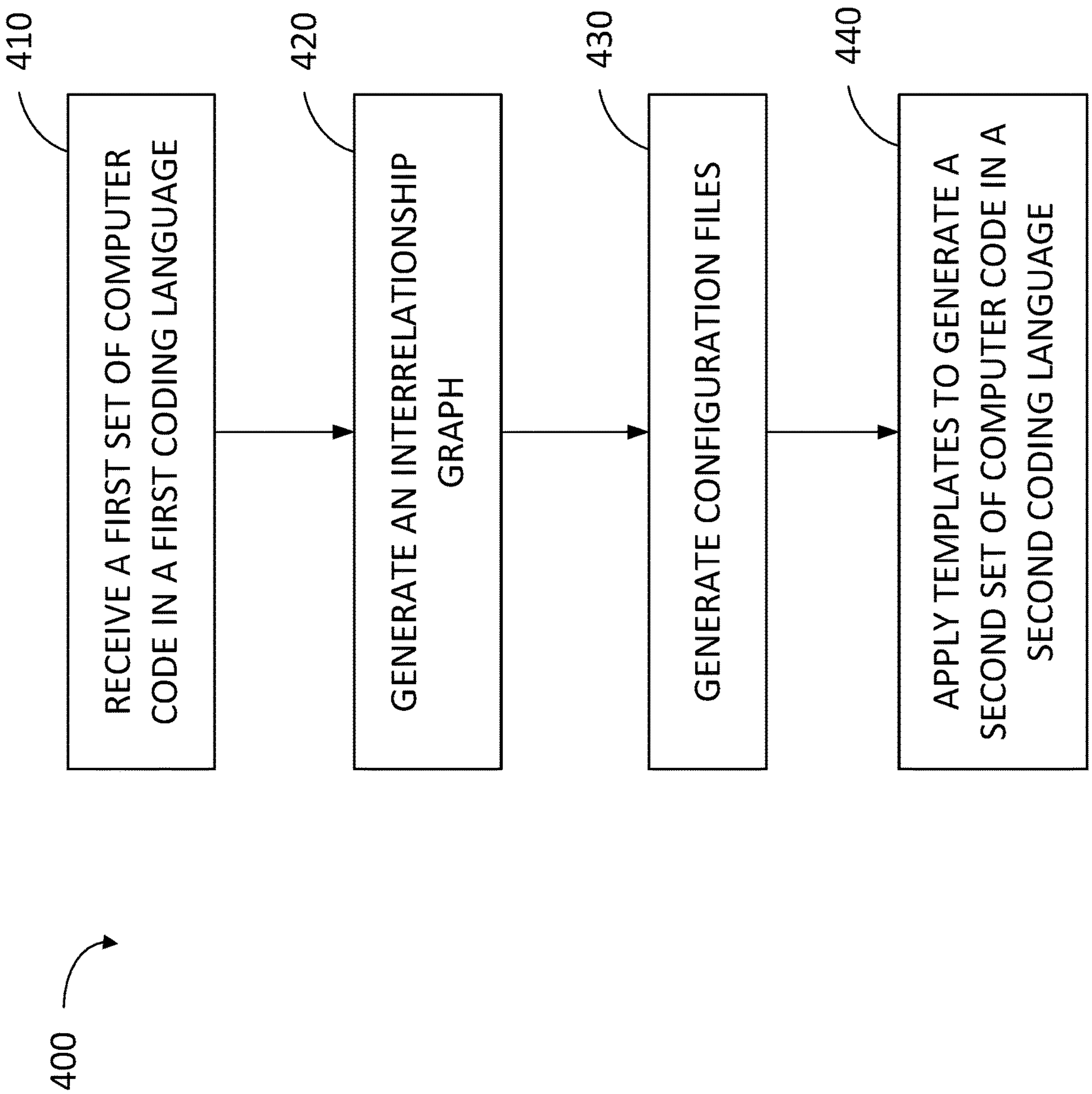
FIG. 4 depicts a flow diagram of an exemplary computer-implemented method for converting computer code according to one embodiment.

FIG. 4 depicts a flow diagram of an exemplary computer-implemented method 400 for converting computer code according to one embodiment. One or more steps of the method 400 may be implemented as a set of instructions stored on a computer-readable memory and executable on one or more processors. Although the method 400 is described herein as being implemented via the exemplary computer environment 100A of FIG. 1A, one will appreciate that the method 400 may also be implemented via any similar computer environment as described herein (e.g., the exemplary computer environment 100B of FIG. 1B, etc.).

The method 400 may begin when a user inputs a first set of computer code in a first coding language via the user device 102, such as inputting code in the code input window 302. The first set of computer code may include a plurality of components as described herein above. At block 410, the server 160 may receive the first set of computer code from the user device 102.

In some embodiments, when the user inputs or edits code manually, the server 160 may provide automatic suggestions or prompts. For example, the automatic suggestions may be code that completes a line that the user is inputting or editing. In another example, the automatic suggestions may be multiple lines of new code generated based upon the code or comments input by the user.

In some embodiments, the automatic suggestions may be interactive. For example, based upon an intended function expressed in the comments input by the user, the server 160 may recommend an algorithm to achieve the intended function. Upon the user accepting the recommended algorithm, the server 160 may populate the code input window 302 with code implementing the suggested algorithm.

In some embodiments, to provide the automatic suggestions or prompts described above, the server 160 may implement a machine learning model (such as the ML module 140, ML chatbot model 550, etc.) trained for this purpose. The machine learning model may be a language model (e.g., a large language model) trained with computer code.

In some embodiments, the server 160 may check the first set of computer code for errors. For example, the server 160 may check the first set of computer code for grammar errors, logical errors, and/or memory leaks. To this end, the server 160 may incorporate features of an integrated development environment (IDE) for various programming languages.

In some embodiments, the virtual assistant 149 may provide, to the user, automatic suggestions or prompts as described above. In some embodiments, the virtual assistant 149 may report to the user the errors in the code as described above. In further embodiments, the virtual assistant 149 may provide suggestions to fix errors.

At block 420, the server 160 may generate an interrelationship graph based upon the first set of code, such as generating the interrelationship graph 315 based upon the code in windows 302*a* and 302*b*. To this end, the server 160 may parse the first set of computer code using regular expression, Abstract Syntax Tree (AST), and/or other appropriate techniques. The server 160 may obtain a list of nodes and a list of edges by parsing the code. In some embodiments, the edges may be directed edges. The server 160 may then generate the interrelationship graph based upon the list of nodes and the list of edges.

In some embodiments, the user may save the list of edges, the list of nodes, and/or the interrelationship graph. The list of edges or nodes may be saved as a text file (e.g., a .txt file) or a table (e.g., a .csv file). The interrelationship graph may be saved as a text file (e.g., an .rtf file) or a graph (e.g., a .drawio file, a .png file, an .svg file). The user may open the saved list or graph with the application disclosed herein or other appropriate applications and edit the list or graph if desired.

In some embodiments, the user may query the interrelationship between a particular node and other nodes. The user may select a particular manner for presenting the interrelationship between the particular node and other nodes.

In some instances, the particular manner is a simplified textual representation (e.g., ASCII representation) printed by a terminal. In the simplified textual representation, a portion of the nodes related to the particular node is printed. For example, in the interrelationship graph 200 in FIG. 2, if user queries the node 202, the terminal may print a textual representation of the nodes in the first branch connected to the node 202, that is, the nodes 204, 206, 214, 224, in this specific order. In an example, in the interrelationship graph 200 in FIG. 2, if user queries the node 202, the terminal may print the nodes that are directly connected to the node 202, that is, the nodes 204, 212, in this specific order.

In yet another example, the user may indicate a preference for the simplified textual representation. More specifically, if the user indicates an interest in a depth of the interrelationship, the terminal may print the first branch connected to the particular node as described in the first example above. Alternatively, if the user indicates an interest in a breadth of the interrelationship, the terminal may print the nodes directly connected to the particular node as described in the second example above.

In some instances, the particular manner is a full textual representation (e.g., ASCII representation) printed by a terminal. In the full textual representation, all the nodes related to the particular node are printed. Further, when printing the related nodes, certain nodes in the interrelationship graph may be revisited. For example, in the interrelationship graph 200 in FIG. 2, if the user queries the node 202, the terminal may print a textual representation of the first branch of nodes related node 202, that is, nodes 204, 206, 214, 224, in this specific order. The terminal may then print a textual representation of the second branch of nodes related node 202, that is, nodes 204, 212, 222, in this specific order. Finally, the terminal may print a third branch of nodes related node 202, that is, nodes 212, 222, in this specific order. As illustrated in this example, nodes 204, 212, 222 are revisited because these nodes exist in more than one branches connected to the particular node 202.

In some instances, the particular manner is a rich-text, tree-like representation printed by a terminal. In the rich-text representation, the characters may be in different typefaces or formats. Some characters may be letters referencing a node. Some characters may be symbols that, in combination, look like a portion of a tree. The rich-text representation may show an entire interrelationship graph, a portion of an interrelationship graph corresponding to a full textual representation, a portion of an interrelationship graph corresponding to a simplified textual representation, or any desired portion of an interrelationship graph.

In some embodiments, the server 160 may determine the coding language of the first set of computer code and apply an appropriate parser based upon the coding language. Responsive to determining that the there is no appropriate parser in the current version of application, the server 160 may search for an appropriate parser on the Internet or online databases. In further embodiments, the server 160 may notify a user that an appropriate parser is not available and may subsequently prompt the user to download or allow download of an appropriate parser. Once the server 160 found an appropriate parser and/or permission to download the parser, the server 160 may obtain and install the appropriate parser into the current version of the application. The server 160 may obtain and install the appropriate parser automatically or only after the user approves these actions.

In some embodiments, the server 160 may add metadata to the interrelationship graph based upon the metadata of the first set of computer code. For example, the first set of computer code may comprise author information for each of the components in the metadata. The server 160 may add the author information as metadata to the corresponding nodes of the interrelationship graph. The user may edit the metadata of the interrelationship graph if the user has sufficient access authorization. In other embodiments, the user may add metadata to the interrelationship graph manually. In both embodiments, the user may cause the server 160 to filter the nodes or edges based upon the metadata of the interrelationship graph. For example, the user may use the metadata to filter nodes corresponding to components that are written by a particular author.

In some embodiments, the server 160 may generate nodes for components that are missing from the first set of computer code, such as the node 208 in FIG. 2. The server 160 may determine, by parsing the code, that a component is required yet missing from the code. The server 160 may generate a list of nodes including a node corresponding to the missing component. The server 160 further may generate an interrelationship graph comprising the node corresponding to the missing component so that the user may add (e.g., via the GUI 300) necessary code or information to allow a successful code conversion.

At block 430, the server 160 may generate a plurality of configuration files based upon the interrelationship graph. In some embodiments, the server 160 may generate the plurality of configuration files based upon the list of nodes and the list of edges. The plurality of configuration files may be associated with at least some of the plurality of components. The configuration file may include values of parameters of corresponding components.

Referring back to FIG. 3C, parameters of the component "firstFunction" may include various information. For example, the parameter "in_class" may indicate whether the component "firstFunction" is within a class. The server 160 may determine that the component "firstFunction" is within a class based upon the interrelationship graph 315, i.e., the edge 316 pointing from the node "firstFunction" 312 to the node "FirstClass" 318 with a keyword "Where." Alternatively, the server 160 may make the same determination based upon the list of nodes and the list of edges.

As another example, the parameter "type" may indicate a type of "firstFunction." The parameter "line.action" may indicate an action of a line inside "firstFunction." As such, the configuration may include context information of a component based upon the interrelationship graph (e.g., "in_class"), information of the component itself (e.g., "type"), and information of the code inside the component (e.g., "line.action"). As illustrated herein, the configuration files preserve the interrelationship among the components of the first set of computer code. Because the second set of computer code is generated by applying templates to the configuration files, the second set of computer code preserves the interrelationship among the components as well.

In some embodiments, the values associated with parameters in the configuration file may differ from the values of the first set of computer code. For example, for the "secondFunction" shown in the code input window 302*a*, a configuration file (not depicted) may include a parameter "line.action" associated with "System.out.println." Instead of generating configuration information as "line.action"="System.out.println," the server 160 may instead generate the corresponding configuration information as "line.action"="print" to associate the "line.action" parameter with a more generic term.

In some embodiments, the configuration files may include parameters associated with a function, instead of a determined constant or token as shown in the configuration file window 320 of FIG. 3C. For example, for the "secondFunction" shown in the code input window 302*a*, a configuration file may include a parameter "line.argument" associated with the function "firstFunction (var2)." As will be described herein below, the server 160 may resolve the function to a value when applying a template to the configuration file.

In some embodiments, the configuration files may include configuration information associated with missing components or missing values. To this end, the server 160 may put default configuration information in the configuration files for the missing components or missing values. Such default configuration information may be stored in the memory 122 or the database 126 and retrieved by the server 160 when needed.

At block 440, the server 160 may apply a plurality of templates associated with a second coding language to the plurality of configuration files to generate a second set of computer code in the second coding language. More specifically, the server 160 may replace parameters in a template with the values associated with the parameters in the corresponding configuration file. In some embodiment, the server 160 may use code libraries to perform this step (e.g., Jinja, Django, Flask, etc.).

In some embodiments, the server 160 may apply the templates to the configuration files based upon the interrelationship graph. For example, referring back to FIG. 3E, based upon the interrelationship graph 315, the server 160 may determine to begin by applying the template associated with "FirstClass" to the corresponding configuration file because both "firstFunction" and "secondFunction" are included in "FirstClass." Accordingly, the server 160 may generate code lines 354 corresponding to "FirstClass." The server 160 may then apply templates associated with "firstFunction" and "secondFunction" to the corresponding configuration files to generate code lines 356 and 358. In some instances, the server 160 may apply templates to configuration files in the same tier in a parallel manner. For example, the server 160 may apply the template associated with "FirstClass" at the same time with applying the template associated with "SecondClass" because "FirstClass" and "Second" in this example are in the same tier, neither of which is included by the other.

In some embodiments, when applying the templates to the configurations, not all parameters need to be used. For instance, in the example illustrated by FIG. 3D, the parameter "type" in the configuration file is not used as that is not needed for the second coding language, Python. However, it may be advantageous to keep such "unnecessary" parameters in the configuration files so that the conversion may be language "agnostic." That is, no matter what second coding language the user chooses, the server 160 would be capable of performing the code conversion.

Conversely, when the server 160 generates configuration files for the first set of computer code in a coding language that inherently lacks certain parameter information, the server 160 may use (i) configuration information input by the user, (ii) default configuration information, and/or (iii) determine configuration information based upon the first computer code (or the corresponding parsed code) and/or the interrelationship graph. For example, if a line in the first set of computer code is "def first_function( )" in Python, the server 160 may determine a type of "first_function" by determining whether the function returns a value, and if it does, what type of value it returns. If the server 160 determines that "first_function" does not return any value, the server 160 may associate the parameter "type" of "first_function" with "void."

In another example, the server 160 may prompt the user to fill in the missing configuration information. The prompt may include default configuration information or configuration information determined based upon the first computer code and/or the interrelationship graph as described herein above. The user may fill in configuration information by accepting the configuration information in the prompt or by inputting configuration information manually.

In some embodiments, the templates are default templates retrieved from a template database stored at the memory 122 or the database 126. In further embodiments, the templates are default templates with the user's edits. In still further embodiments, the templates may be received from the user (e.g., manually input by the user). When a user inputs and edits templates manually, the server 160 may provide automatic suggestions or prompts in a similar manner as described herein above with respect to block 410.

In yet further embodiments, the templates may be generated by the server 160 based upon the user's instructions. The instructions may include what result the user wishes to achieve with the new code, what language the user wishes to use for the new code, how efficient (e.g., time complexity and/or memory complexity) the user wishes the new code to be, etc. The user may give instructions by filling out a form provided by the application. Alternatively, the user may give instructions with natural languages (e.g., by text, audio, and/or video) to a virtual assistant (such as the virtual assistant 149). In some embodiments, the application and/or the virtual assistant may employ natural language processing techniques and/or incorporate features of a chatbot.

In some embodiments, after a user inputs a template or the server 160 generates a template, the server 160 may add the template into a template database. The template database may be common for all users or be associated with a particular user. As such, when a user needs to re-use a template, the user may retrieve the template from the template database and would not need to input or generate the template again.

In some embodiments, when applying the templates to the configuration files, the server 160 may resolve a value of a parameter associated with a function at run-time. For example, for the "secondFunction" shown in the code input window 302*a*, a configuration file may include a parameter "line.argument" associated with the function "firstFunction (var2)." Instead of replacing the corresponding template portion with "firstFunction (var2)," the server 160 may resolve "firstFunction (var2)" to be equivalent to "var2" based upon the configuration file associated with "firstFunction" and replace the corresponding template portion with "var2." As a result, the line "print firstFunction (var2)" shown in code generation window 350 would be "print var2" instead. The server 160 may employ deep learning or other machine learning techniques to perform this functionality, e.g., via the ML module 140 or ML chatbot model 550.

When employing the machine learning techniques, the server 160 may use appropriate code libraries such as "Thinc."

In some embodiments, the server 160 may add, remove, or change the code generated by literally applying the templates. For example, a parameter "line.action" may be associated with a generic term "print." If the user chooses the second coding language to be C++, the server 160, when applying a template to the configuration information "line.action"="print," the server 160 may (1) add a line "#include <iostream>" to the generated code and (2) generate a line beginning with "cout<<" or change the originally generated line beginning with "print" to a line beginning with "cout<<." In another example, the server 160 may change the names of the functions and classes in accordance with the convention of the second coding language. If the second coding language is Python, the server 160 may change the name "firstFunction" to "first_function," and the name "FirstClass" to "First_Class." In some embodiments, the server 160 may make such adjustments at the same time with generating the code rather than after the code is generated.

It should be understood that not all blocks of the exemplary flow diagrams 400 are required to be performed. It should be also understood that additional and/or alternative steps may be performed.

ADDITIONAL CONSIDERATIONS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112 (f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionalities presented as separate components in exemplary configurations may be implemented as a combined structure or component. Similarly, structures and functionalities presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware functionalities of a computer system (e.g., a processor or a group of processors) may be configured by software (e.g., an application or application portion) as a hardware functionality that operates to perform certain operations as described herein.

In various embodiments, a hardware functionality may be implemented mechanically or electronically. For example, a hardware functionality may comprise dedicated circuitry or logic that is permanently configured (e.g., as a special-purpose processor, such as a field programmable gate array (FPGA) or an application-specific integrated circuit (ASIC) to perform certain operations). A hardware functionality may also comprise programmable logic or circuitry (e.g., as encompassed within a general-purpose processor or other programmable processor) that is temporarily configured by software to perform certain operations. It will be appreciated that the decision to implement a hardware functionality mechanically, in dedicated and permanently configured circuitry, or in temporarily configured circuitry (e.g., configured by software) may be driven by cost and time considerations.

Accordingly, the term "hardware functionality" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware functionalities are temporarily configured (e.g., programmed), each of the hardware functionalities need not be configured or instantiated at any one instance in time. For example, where the hardware functionalities comprise a general-purpose processor configured using software, the general-purpose processor may be configured as respective different hardware functionalities at different times. Software may accordingly configure a processor, for example, to constitute a particular hardware functionality at one instance of time and to constitute a different hardware functionality at a different instance of time.

Hardware functionalities can provide information to, and receive information from, other hardware functionalities. Accordingly, the described hardware functionalities may be regarded as being communicatively coupled. Where multiple of such hardware functionalities exist contemporaneously, communications may be achieved through signal transmission (e.g., over appropriate circuits and buses) that connect the hardware functionalities.

In embodiments in which multiple hardware functionalities are configured or instantiated at different times, communications between such hardware functionalities may be achieved, for example, through the storage and retrieval of information in memory structures to which the multiple hardware functionalities have access. For example, one hardware functionality may perform an operation and store the output of that operation in a memory device to which it is communicatively coupled. A further hardware functionality may then, at a later time, access the memory device to retrieve and process the stored output. Hardware functionalities may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented functionalities that operate to perform one or more operations or functions. The functionalities referred to herein may, in some exemplary embodiments, comprise processor-implemented functionalities.

Similarly, the methods or routines described herein may be at least partially processor-implemented. For example, at least some of the operations of a method may be performed by one or more processors or processor-implemented hardware functionalities. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

The systems and methods described herein are directed to an improvement to computer functionality, and improve the functioning of conventional computer systems.

What is claimed:

1. A computer-implemented method for converting computer code to a new coding language, comprising:

receiving, by one or more processors, a first set of computer code in a first coding language and comprising a plurality of components;

generating, by the one or more processors, an interrelationship graph of the plurality of components based upon the first set of computer code, wherein the interrelationship graph represents an interrelationship among a plurality of nodes associated with the plurality of components;

adding, by the one or more processors, metadata to the interrelationship graph;

filtering, by the one or more processors, the plurality of nodes based upon the metadata of the interrelationship graph to generate a filtered set of nodes;

generating, by the one or more processors using the filtered set of nodes and based upon the interrelationship graph, a plurality of configuration files; and applying, by the one or more processors, a plurality of templates associated with a second coding language to the plurality of configuration files to generate a second set of computer code in the second coding language.

2. The computer-implemented method of claim 1, wherein generating the interrelationship graph includes:

parsing, by the one or more processors via a virtual assistant, the first set of computer code to obtain the plurality of nodes and a plurality of directed edges, wherein the plurality of nodes includes nodes associated with the plurality of components, and the plurality of directed edges represents an interrelationship among the plurality of nodes; and generating, by the one or more processors via the virtual assistant, the interrelationship graph including the plurality of nodes and the plurality of directed edges.

3. The computer-implemented method of claim 2, wherein generating the plurality of configuration files includes: generating, by the one or more processors, the plurality of configuration files based upon the plurality of nodes and the plurality of directed edges.

4. The computer-implemented method of claim 1, wherein the interrelationship among the plurality of components comprises at least one of:

(i) an input of a second component of the plurality of components including an output of a first component of the plurality of components, (ii) a second component calling a first component, or (iii) a second component including a first component.

5. The computer-implemented method of claim 1, wherein the plurality of components includes at least one of: (i) one or more functions, (ii) one or more classes, or (iii) one or more files.

6. The computer-implemented method of claim 1, wherein the plurality of templates is retrieved from a template database or received from a user.

7. The computer-implemented method of claim 1, wherein:

the plurality of configuration files includes a plurality of parameters, and at least one parameter of the plurality of parameters is associated with a function, wherein the function generates a value associated with the at least one parameter when applying the plurality of templates to the plurality of configuration files.

8. A computing system for converting computer code to a new coding language, comprising:

one or more processors; and a memory storing executable instructions thereon that, when executed by the one or more processors, cause the one or more processors to:

receive a first set of computer code in a first coding language and comprising a plurality of components;

generate an interrelationship graph of the plurality of components based upon the first set of computer code, wherein the interrelationship graph represents an interrelationship among a plurality of nodes associated with the plurality of components;

add metadata to the interrelationship graph;

filter the plurality of nodes based upon the metadata of the interrelationship graph to generate a filtered set of nodes;

generate, using the filtered set of nodes and based upon the interrelationship graph, a plurality of configuration files; and apply a plurality of templates associated with a second coding language to the plurality of configuration files to generate a second set of computer code in the second coding language.

9. The computing system of claim 8, wherein to generate the interrelationship graph, the executable instructions, when executed by the one or more processors, further cause the one or more processors to:

parse, via a virtual assistant, the first set of computer code to obtain the plurality of nodes and a plurality of directed edges, wherein the plurality of nodes includes nodes associated with the plurality of components, and the plurality of directed edges represents an interrelationship among the plurality of nodes; and generate, via the virtual assistant, the interrelationship graph including the plurality of nodes and the plurality of directed edges.

10. The computing system of claim 9, wherein to generate the plurality of configuration files, the executable instructions, when executed by the one or more processors, further cause the one or more processors to: generate the plurality of configuration files based upon the plurality of nodes and the plurality of directed edges.

11. The computing system of claim 8, wherein the interrelationship among the plurality of components comprises at least one of:

(i) an input of a second component of the plurality of components including an output of a first component of the plurality of components, (ii) a second component calling a first component, or (iii) a second component including a first component.

12. The computing system of claim 8, wherein the plurality of components includes at least one of: (i) one or more functions, (ii) one or more classes, or (iii) one or more files.

13. The computing system of claim 8, wherein the plurality of templates is retrieved from a template database or received from a user.

14. The computing system of claim 8, wherein:

the plurality of configuration files includes a plurality of parameters, and at least one parameter of the plurality of parameters is associated with a function, wherein the function generates a value associated with the at least one parameter when applying the plurality of templates to the plurality of configuration files.

15. A non-transitory, computer-readable storage medium comprising non-transitory computer-readable instructions stored thereon for converting computer code to a new coding language, wherein the instructions, when executed by one or more processors, cause the one or more processors to:

receive a first set of computer code in a first coding language and comprising a plurality of components;

generate an interrelationship graph of the plurality of components based upon the first set of computer code, wherein the interrelationship graph represents an interrelationship among a plurality of nodes associated with the plurality of components;

add metadata to the interrelationship graph;

filter the plurality of nodes based upon the metadata of the interrelationship graph to generate a filtered set of nodes;

generate, using the filtered set of nodes and based upon the interrelationship graph, a plurality of configuration files; and apply a plurality of templates associated with a second coding language to the plurality of configuration files to generate a second set of computer code in the second coding language.

16. The non-transitory, computer-readable storage medium of claim 15, wherein to generate the interrelationship graph, the instructions when executed by the one or more processors, cause the one or more processors to:

parse, via a virtual assistant, the first set of computer code to obtain the plurality of nodes and a plurality of directed edges, wherein the plurality of nodes includes nodes associated with the plurality of components, and the plurality of directed edges represents an interrelationship among the plurality of nodes; and generate, via the virtual assistant, the interrelationship graph including the plurality of nodes and the plurality of directed edges.

17. The non-transitory, computer-readable storage medium of claim 16, wherein to generate the plurality of configuration files, the instructions when executed by the one or more processors, cause the one or more processors to: generate the plurality of configuration files based upon the plurality of nodes and the plurality of directed edges.

* * * * *